U. S. ROBINSON.
RESILIENT TIRE.
APPLICATION FILED JULY 27, 1918.

1,302,974.

Patented May 6, 1919.
2 SHEETS—SHEET 1.

Inventor
U. S. Robinson,
By Lancaster & Allwine
his Attorneys

U. S. ROBINSON.
RESILIENT TIRE.
APPLICATION FILED JULY 27, 1918.
1,302,974.
Patented May 6, 1919.
2 SHEETS—SHEET 2.
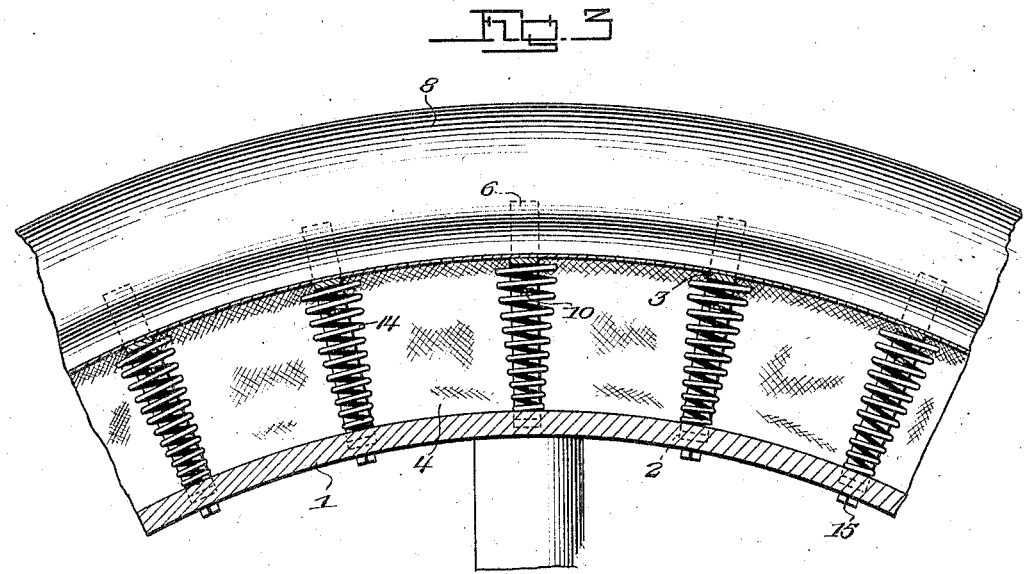
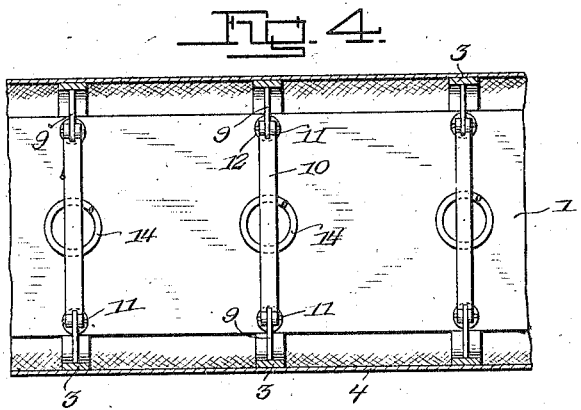
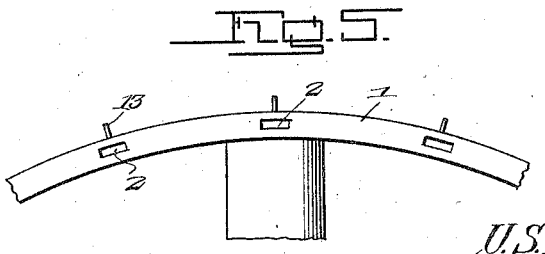
Inventor
U. S. Robinson,

UNITED STATES PATENT OFFICE.

ULYSSES S. ROBINSON, OF LAGRANGE, GEORGIA, ASSIGNOR OF ONE-THIRD TO MICHAEL FORCDS, OF LAGRANGE, GEORGIA.

RESILIENT TIRE.

1,302,974.     Specification of Letters Patent.    Patented May 6, 1919.

Application filed July 27, 1918. Serial No. 247,034.

*To all whom it may concern:*

Be it known that I, ULYSSES S. ROBINSON, a citizen of the United States, and a resident of Lagrange, in the county of Troup and State of Georgia, have invented certain new and useful Improvements in Resilient Tires, of which the following is a specification.

This invention relates to resilient tires, adapted for use upon vehicle wheels, in lieu of the ordinary pneumatic tires now commonly in use and the primary object of the invention is to provide a resilient or spring tire structure which is comparatively simple in construction, neat in appearance and one which will absorb shock occasioned by the travel of a vehicle over undulations in a road surface.

More specifically, the object of this invention is to provide a resilient tire structure which includes, a rim having a plurality of flat springs attached thereto at spaced circumferential intervals which springs are bent to form a skeleton structure for the tire casing or housing and have a flexible covering attached thereto which incloses the internal construction of the tire; to bend the flat springs at their crown portions to form a seat for receiving the inner edge of a resilient tread which extends circumferentially about the tread portion of the resilient tire structure; and to provide a plurality of spiral springs within the tire structure which co-acts with the flat springs to increase the resiliency and stability of the tire.

Other objects of the invention will appear in the following detailed description, taken in connection with the accompanying drawings, forming a part of this specification and in which drawings:

Fig. 3 is a fragmentary longitudinal section through the tire.

Fig. 4 is a fragmentary horizontal section through the tire.

Fig. 5 is a detail in side elevation of a part of the rim structure illustrating the manner of connecting the ends of the flat springs thereto.

Figure 1:
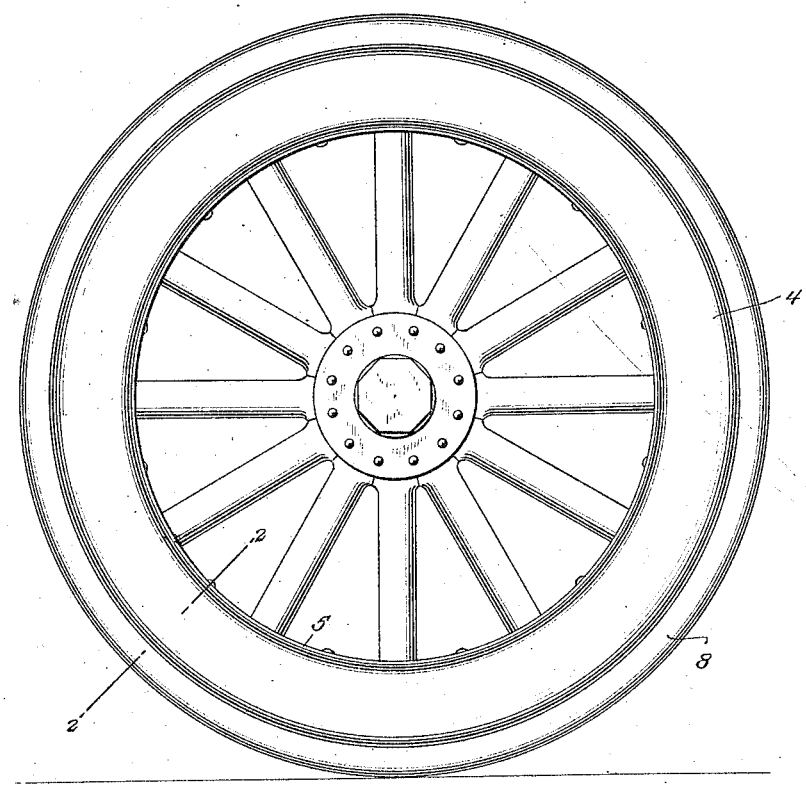
Figure 1 is a side elevation of the improved tire.

Referring more particularly to the drawings, 1 indicates the rim of a vehicle wheel to which the improved tire is attached.

The rim 1 is provided with a plurality of recesses 2 extending inwardly from its side edges in circumferential spaced relation. The recesses 2 receives the ends of flat springs 3. The flat springs 3 are bent to form a resilient skeleton frame for the tire structure, and they are covered with a flexible covering 4, preferably of heavy fabric, the edges of which covering are attached to the inner surface of the rim 1 by suitable binding strips 5. The flat springs 3 are bent at their crown portions to provide inwardly curving portions 6 which terminate in a substantially horizontal portion 7. The curved portions 6 and the flat portions 7 co-act to form a seat for the inner portion of a resilient tread 8. The resilient tread 8 is preferably constructed of solid rubber and this tread extends circumferentially about the tire and projects outwardly from the outermost portions of the springs 3 and the covering 4.

The flat springs 3 each have a pair of inwardly directed arms 9 formed thereupon and extending inwardly from opposite sides of the springs in alinement with each other. A bar 10 is pivotally connected as shown at 11 to each pair of the arms 9 and these bars extend transversely across the interior of the tire. Spiral springs 12 are connected to the bars 10 at their pivots, and to lugs 13 which are carried by the rim 1. When one of the springs 12 is compressed by compression of the corresponding portion of the resilient tire, the opposed spring will be stretched, whereby a compensating resilient movement will be provided and which will cause the tire to more quickly assume its normal shape after compression of any portion thereof.

Figure 2:
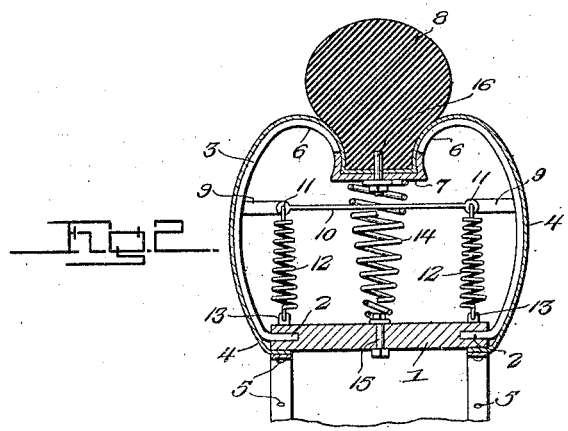
Fig. 2 is a section on the line 2—2 of Fig. 1.

Helical springs 14 are attached to the rim 1 in circumferentially spaced relation at the center of the rim by suitable bolts 15 and to the under surface of the tread seat 7 of the springs 3 by suitable bolts 16. The helical springs 14 have their bases engaging the inner surfaces of the seat 7 while their apices engage the outer surface of the rim 1 as clearly shown in Fig. 2 of the drawings.

Having thus fully described the invention, what is claimed is:

1. In a resilient tire, a rim, a plurality of flat springs attached to said rim and curved to form a resilient skeleton for the tire, cross bars pivotally connected at their ends to said flat springs, and spiral springs connected to said bars at their pivotal connection with the flat springs and to said rim.

2. In a resilient tire, a rim, a plurality of flat springs attached to said rim and curved to form a resilient skeleton for the tire, a resilient tire tread upon said resilient skeleton, a plurality of helical springs extending between the crowns of said flat springs and said rim, said springs having their bases outermost and cross bars pivotally connected at their ends to said flat springs and extending transversely through the tire.

3. In a resilient tire, a rim, a plurality of flat springs attached to said rim and curved to form a resilient skeleton for the tire, a plurality of helical springs extending between the crowns of said flat springs and said rim, cross bars pivotally connected at their ends to said flat springs and extending transversely through the tire and between convolutions of said helical springs.

4. In a resilient tire, a rim, a plurality of flat springs attached to said rim and curved to form a resilient skeleton for the tire, a flexible covering mounted over said springs, said springs being bent at their crown portions to form a tire tread seat, a resilient tire tread in said seat, a plurality of helical springs extending between said seat and said rim, said spring having their bases outermost, and cross bars pivotally connected at their ends to said flat springs and extending transversely through said tire.

5. In a resilient tire, a rim, a plurality of flat springs attached to said rim and curved to form a resilient skeleton for the tire, a flexible covering mounted over said springs, said springs being bent at their crown portions to form a tire tread seat, a resilient tire tread in said seat, a plurality of helical springs extending between said seat and said rim, said springs having their bases outermost, cross bars pivotally connected at their ends to said flat springs and extending transversely through said tire, and spiral springs connected to said rim and said bars at the ends of the bars.

6. In a resilient tire, a rim provided with a plurality of recesses extending inwardly from its side edges, flat springs having their ends seated in said recesses, said springs being curved to form a resilient skeleton for a tire, a flexible covering mounted over said springs, said springs being bent at their crown portions to form a tire tread seat, a resilient tread in said seat, arms formed upon and projecting inwardly from the said flat springs, a bar pivotally connected to each corresponding pair of said arms, and spiral springs connected to said bars at their pivots and to said rim.

ULYSSES S. ROBINSON.

Witness:
W. R. CAMPBELL, Jr.